(12) United States Patent
Gelbart (10) Patent No.: US 7,042,624 B2
(45) Date of Patent: May 9, 2006

(54) NON-UNIFORM LIGHT VALVE

(75) Inventor: Daniel Gelbart, Vancouver (CA)

(73) Assignee: Kodak Graphic Communications, Canada Company, Burnaby (CA)

( * ) Notice: Subject to any disclaimer, the term of this patent is extended or adjusted under 35 U.S.C. 154(b) by 271 days.

(21) Appl. No.: 10/628,887

(22) Filed: Jul. 29, 2003

(65) Prior Publication Data

US 2005/0024706 A1    Feb. 3, 2005

(51) Int. Cl.
G02B 26/00    (2006.01)
G02B 26/02    (2006.01)

(52) U.S. Cl. .................................. 359/292; 359/231

(58) Field of Classification Search ................ 359/198, 359/201, 214, 215, 224, 230, 231, 295, 290–292, 359/298, 319, 846, 847, 850, 852; 347/135, 347/136; 348/755, 771; 345/31, 85, 108
See application file for complete search history.

(56) References Cited

U.S. PATENT DOCUMENTS

| | | | |
|---|---|---|---|
| 4,374,397 A * | 2/1983 | Mir | 358/505 |
| 4,965,242 A | 10/1990 | DeBoer et al. | 503/327 |
| 6,146,792 A | 11/2000 | Blanchet-Fincher et al. | 430/7 |

* cited by examiner

Primary Examiner—Ricky L. Mack
Assistant Examiner—William Choi (57) ABSTRACT

A light valve for use in an imaging head for imaging a regular pattern with relatively large imaged areas in a pre-determined orientation has low resolution channels and high resolution channels corresponding to the pattern to be imaged.

31 Claims, 5 Drawing Sheets

NON-UNIFORM LIGHT VALVE

TECHNICAL FIELD

The invention relates to imaging systems and more particularly to a light valve for use in an imaging system.

BACKGROUND

Commonly employed fabrication techniques for displays and polymer based devices or other semiconductor electronic devices involve several imaging steps. A substrate coated with a resist or other sensitive material is exposed to radiation through a photo-tool mask to effect some change. By nature these fabrication processes involve a large number of separate steps, each step commonly having a finite risk of failure, thus reducing the overall process yield and increasing the cost of fabricating the finished article. A specific example is the fabrication of color filters for flat panel displays. Color filter fabrication can be a very expensive process because of the high cost of materials and low process yield. Traditional photolithographic processing involves applying color resist materials to a substrate using various coating techniques such as spin coating, slit and spin and spin-less coating. The material is then exposed via a photo-tool mask followed by a development process.

Direct imaging has been proposed for use in the fabrication of displays and in particular color filters. U.S. Pat. No. 4,965,242 to DeBoer et al. describes a dye transfer process for making a color filter element. A dye receiving element is overlaid with a dye donor element which is then imagewise heated to selectively transfer the dye from the donor to the receiver. The preferred method of imagewise heating is by means of a laser beam. Diode lasers are particularly preferred for their ease of modulation, low cost and small size.

Direct imaging has the potential for replacing a multiplicity of steps associated with traditional photolithographic processes with a single imaging step. A downside of direct imaging is that the laser beam is required to scan over the entire surface of the substrate. This necessitates very fast imagewise scanning of the substrate in order to preserve the advantages of direct imaging over flood exposure. Flood exposure through a photo-tool mask is by nature a very fast imaging process because a small substrate may be exposed at once, or a series of quick step repeat exposures may be used for larger substrates. One way to increase the speed of the direct imaging is to expose the substrate simultaneously with a plurality of laser beams. U.S. Pat. No. 6,146,792 to Blanchet-Fincher et al. describes the production of a durable image on a receiver element, such as a color filter. The laser head suggested in the examples consists of thirty-two 830 nm laser diodes, each having approximately 90 mW of single-mode output.

Imaging heads with even more channels are now commonly available, exemplified by the SQUAREspot® thermal imaging heads manufactured by Creo Inc. of Burnaby, British Columbia, Canada. These imaging heads are available with up to 240 independent imaging channels each channel having upwards of 100 mW of optical output power per channel. Such imaging heads offer imaging of a small 370×470 mm color filter substrate in around 3 minutes for a media sensitivity of 450 $mJ/cm^2$.

Further improvement in imaging speed is often frustrated by the trade-off between imaging resolution and speed. Color element edge definition requirements dictate that a small pixel size be used (i.e. high resolution imaging). However, the smaller the pixel, the longer it takes to scan over the substrate to effect the imagewise exposure. The availability of imaging heads with progressively more channels does not entirely address this problem since the required number of channels are difficult to provide in an economical and practical imaging system.

The speed/resolution trade-off, coupled with the industry trends towards processing larger and larger substrates presents a unique challenge for direct imaging systems. Larger substrates are not only of application in producing larger displays but also in improving the economy and yield of smaller display panel fabrication. A large substrate may be processed and later separated into a number of smaller panels. Having more panels per processed substrate reduces the chance that an entire substrate that has been processed will be un-unusable (2 faults on a 4 panel substrate is a 50% yield while the same 2 faults on a 12 panel substrate is an 83% yield). In the display fabrication industry, so-called "sixth generation" flat panel display substrate sizes are around 1500×1800 mm. For the example above having 450 $mJ/cm^2$ media sensitivity the imaging time with the 240 channel imaging head would be in the region of 45 minutes, which is prohibitively long, particularly when compared to flood exposure, which is only marginally slower for a larger substrate where relatively large areas are imaged in a series of step and repeat exposures.

There remains a need for higher productivity direct imaging techniques used in the fabrication of color filters and other polymer based electronic devices.

SUMMARY OF THE INVENTION

The present invention is described in relation to a light valve specifically adapted for direct imaging of patterns that have some regular form with relatively large features in a pre-determined pattern.

In a first aspect of the present invention a light valve for use in an imaging system has a plurality of individually driven channels. The channels have non-uniform size in accordance with a predetermined regular pattern to be imaged.

In another aspect of the present invention a method for imaging a regular pattern of features with a multi-channel imaging system is provided. The pattern is analyzed to identify the features. A body portion of the feature is imaged with a low resolution channel and an edge of the feature is imaged with at least one high resolution channel.

In yet another aspect of the invention a method of fabricating a light valve for imaging a regular pattern of features with a multi-channel imaging system is provided. The pattern is analyzed to identify the features. A plurality of uniform regularly spaced light valve elements are fabricated on a light valve substrate and groups of elements are connected to form low resolution channels and high resolution channels corresponding to the pattern.

For an understanding of the invention, reference will now be made by way of example to a following detailed description in conjunction by accompanying drawings.

BRIEF DESCRIPTION OF THE DRAWINGS

In drawings which illustrate by way of example only preferred embodiments of the invention:

FIG. 2-A is a plane view of a portion of a prior art color filter configuration;

FIG. 2-B is a plane view of a portion of another prior art color filter configuration;

FIG. 3-A is a schematic view of a light valve shown in relation to a substrate, depicting a step in an imaging method according to the present invention;

FIG. 3-B is a schematic view of a light valve shown in relation to a substrate, depicting another step in an imaging method according to the present invention.

DESCRIPTION

Figure 1:
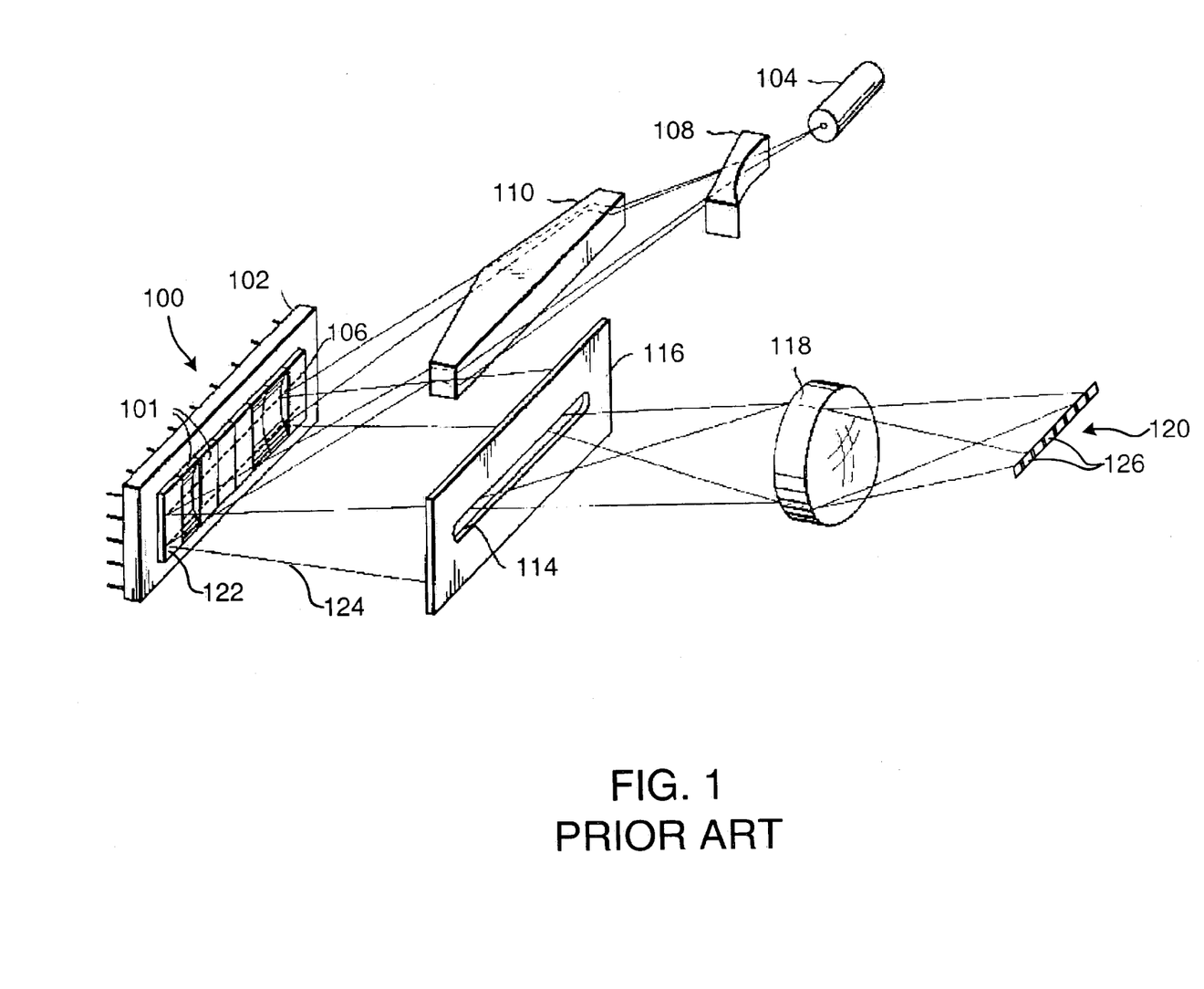
FIG. 1 is a perspective view of the optical system of a prior art imaging head.

A prior art light valve based imaging head is shown in FIG. 1. A linear light valve 100 comprising a plurality of deformable mirror elements 101 is fabricated on a silicon substrate 102. A laser 104 generates an illumination line 106 (shown as a broken line) using an anamorphic beam expander comprising cylindrical lenses 108 and 110. U.S. Pat. No. 5,517,359 to Gelbart describes a method for forming illumination line 106. The illumination line 106 is laterally spread across the plurality of elements 101 so that each of the elements 101 is illuminated by a portion of illumination line 106.

When any particular element, for example element 122, is un-actuated it forms a flat reflective surface and most of the light 124 reflected from the un-actuated element is blocked by aperture stop 116. When an element is actuated it forms a curved mirror surface that focuses the light reflected from the actuated element through aperture 114. A lens 118 images light valve 100 to form an imaging swath 120 comprising a plurality of individually modulated beams or channels 126 (corresponding to individual elements 101), which are scanned over the area of the substrate form an image. Further details of the operation of the light valve 100 of FIG. 1 are contained in commonly assigned U.S. Pat. No. 6,147,789 to Gelbart. The light valve may be fabricated to operate over a range of wavelengths from ultra violet, through the visible spectrum, and into the infrared spectrum.

When imaging rigid substrates, as is common in fabricating display panels, the scanner used is usually a flatbed scanner that secures a substrate in a flat orientation. The substrate or the imaging beams, or a combination of both are displaced relative to each other to effect the scan. U.S. patent application Ser. No. 10/440235 to Gelbart discloses an example of a high speed flatbed scanner suitable for display panel imaging. Alternatively, flexible substrates may be secured on either the external or the internal surface of a drum scanner to effect a scan. Even a substrate that is traditionally thought of as rigid, such as glass, may be scanned on a drum scanner provided that the substrate is sufficiently thin and the diameter of the drum is sufficiently large.

In general a light valve such as that shown in FIG. 1 has a separate driver channel for each element 101. For many types of light valve, the drivers are a limiting factor in how many channels may be accommodated. While a particular light valve may be fabricated with more channels, the practical considerations of accommodating a large number of drivers, usually in close proximity to the light valve, dictates a maximum limit for the number of channels that can be individually driven. Furthermore, removing the heat generated by the switching of the driver circuitry also presents another particularly difficult challenge. Other practical considerations such as the vast number of electrical connections required between the drivers and the light valve elements may be another limiting factor.

Other light valve based imaging heads are well known in the art, employing a variety of techniques to provide a plurality of light beams. Specific examples include PLZT light valves (U.S. Pat. No. 5,517,359), TIR light valves (U.S. Pat. No. 6,169,565) and grating light valves (U.S. Pat. Nos. 5,311,360 and 5,661,592).

Figure 2:
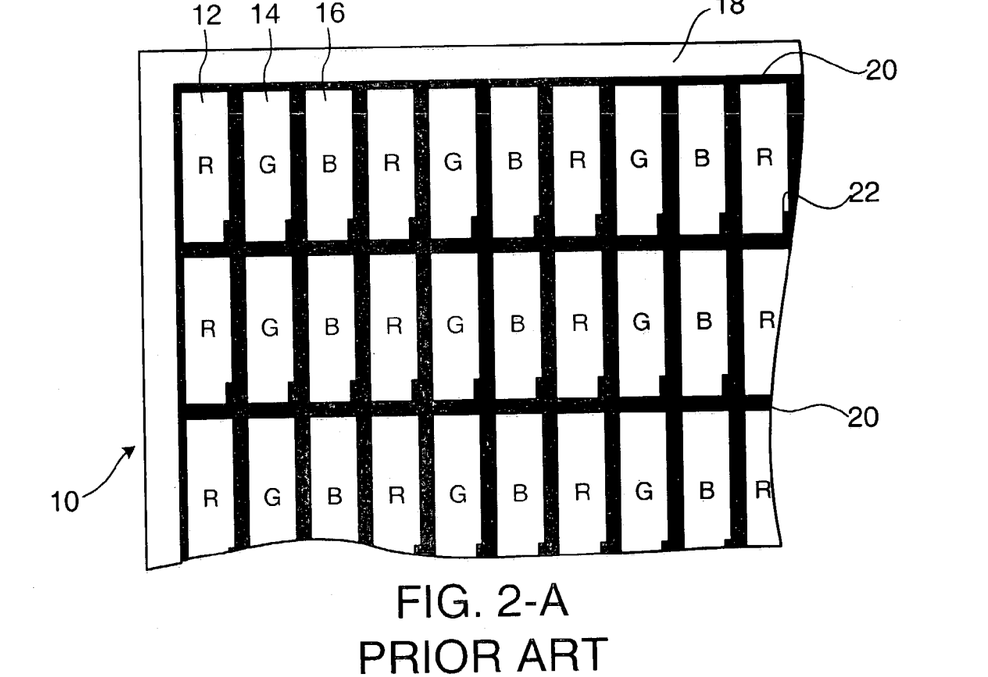

Several configurations of color-elements are used in color filters for LCD display panels. Stripe configurations, shown in FIG. 2-A, have alternating columns of red, green and blue color elements and are currently the most common color element configuration. Mosaic configurations, shown in FIG. 2-B, have color elements alternating in both directions and provide improved color mix. Delta configurations (not-shown) have red, green and blue filter elements in a triangular relationship to each other and provide the best color mix. The mosaic and delta configuration color filters are more difficult to fabricate, the mosaic configuration additionally requiring a more complex driving circuit.

FIG. 2-A shows a portion of a stripe configuration color filter 10. The color filter 10 comprises a plurality of red, green and blue color elements 12, 14 and 16 formed in alternating columns across a substrate 18. Color elements 12, 14, 16 are outlined by a black matrix layer 20, which divides the elements and prevents the backlight leaking between elements. The columns are commonly imaged in elongate stripes and then subdivided by the black matrix 20 into individual color-elements 12, 14, 16. The TFT transistor on the associated LCD panel (not shown) is also masked by a portion of the black matrix at area 22.

FIG. 2-B shows a color filter 24 in the mosaic configuration, the only difference from the stripe configuration filter shown in FIG. 1 being the layout of the color elements, 12, 14, 16, which alternate in color down the columns as well as across the columns.

Figure 3:
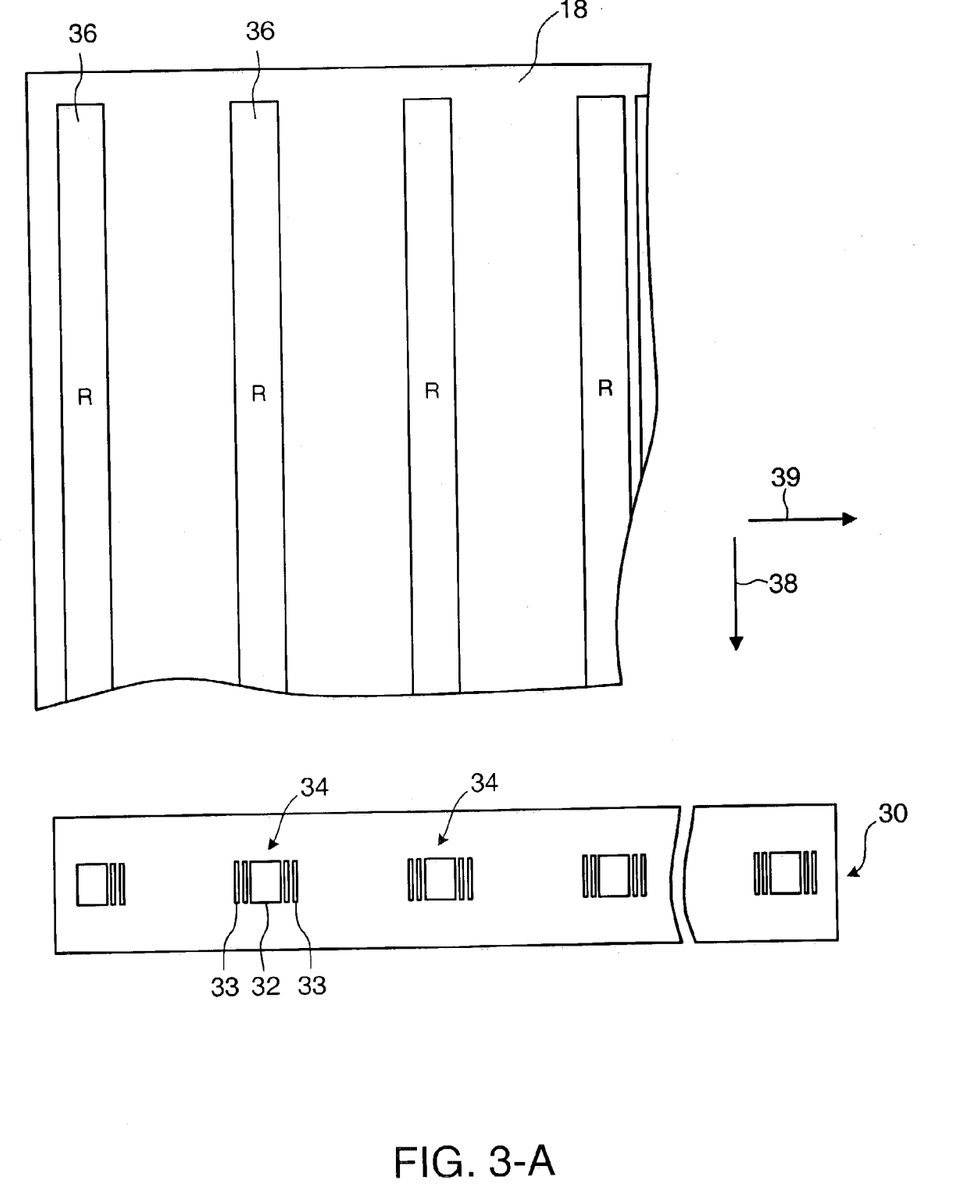

In an embodiment of the present invention a color filter is fabricated by the direct imaging of a dye donor element placed in close contact with a receiver substrate. The dye is imagewise transferred to the substrate using a multi-channel light valve imaging system. The red, green and blue portions of the filter are imaged in separate steps, each time replacing the dye donor element with the next color dye to be transferred. The light valve has a specially configured channel layout in accordance with the pattern being imaged. More specifically, the light valve, shown in FIG. 3-A at 30, has low resolution channels 32 and high resolution channels 33 arranged in groups 34 according to the image pattern to be printed. Low resolution channels 32 correspond to the interior portion (distal to the edges) of the stripe being imaged (in this case the red stripes 36 on substrate 18). High resolution channels 33 correspond to the edges of the stripes 36, ensuring that the stripes 36 have good edge definition. In this embodiment, the spacing between each group 34 further corresponds to a predetermined spacing between adjacent stripes 36, but this is not mandated. Stripes 36 are formed on substrate 18 by scanning the beams produced by the light valve 30 in the main scan direction indicated by arrow 38. After each scan in direction 38, the light valve is displaced in the sub-scan direction 39 to start a new main scan in direction 38 thus eventually imaging the entire substrate. It should be understood that while light valve 30 is shown in FIG. 3-A at the same scale as the imaged pattern, the schematic illustration is only intended to show the correspondence between the light valve groups 34 and the pattern being written and not a physical relationship. In practice, as shown in FIG. 1, the light valve may be imaged onto the substrate by a lens 118, which may reformat the size and shape of the imaging swath at the plane of the substrate.

The inclusion of high resolution channels 33 allows the width of stripe 36 to be precisely adjusted to suit the media or other conditions that may affect the imaged stripe width on the substrate. In color filter fabrication is it very important to fabricate stripes within a tight width tolerance and hence some measure of adjustment is necessary. The combination of low resolution channels 32 and high resolution channels 33 allows the benefit of imaging with a fixed mask light valve while still providing the flexibility to adjust the resultant pattern within some range.

Similarly, in FIG. 3-B the imaging of the green stripes 40 on substrate 18 is depicted, red stripe 36 having been imaged in a previous step. The imaging start position of light valve 30 has been displaced in direction 39 to align with the intended location of the green stripes 40. The blue stripes are imaged in a third step (not shown).

The non-uniform light valve configuration significantly reduces the number of drivers required by ganging together connections to low resolution channels 32, thus enabling low resolution channel 32 to be addressed by a single driver via a single connection. Furthermore, for a given number of drivers, the optionally extended spacing between groups 34 in direction 39 allows a much wider swath to be scanned on each successive scan in direction 38. The number of high and low resolution channels that can be fabricated on a light valve is limited only by the substrate size and not by a limit on the number of drivers.

Figure 4:
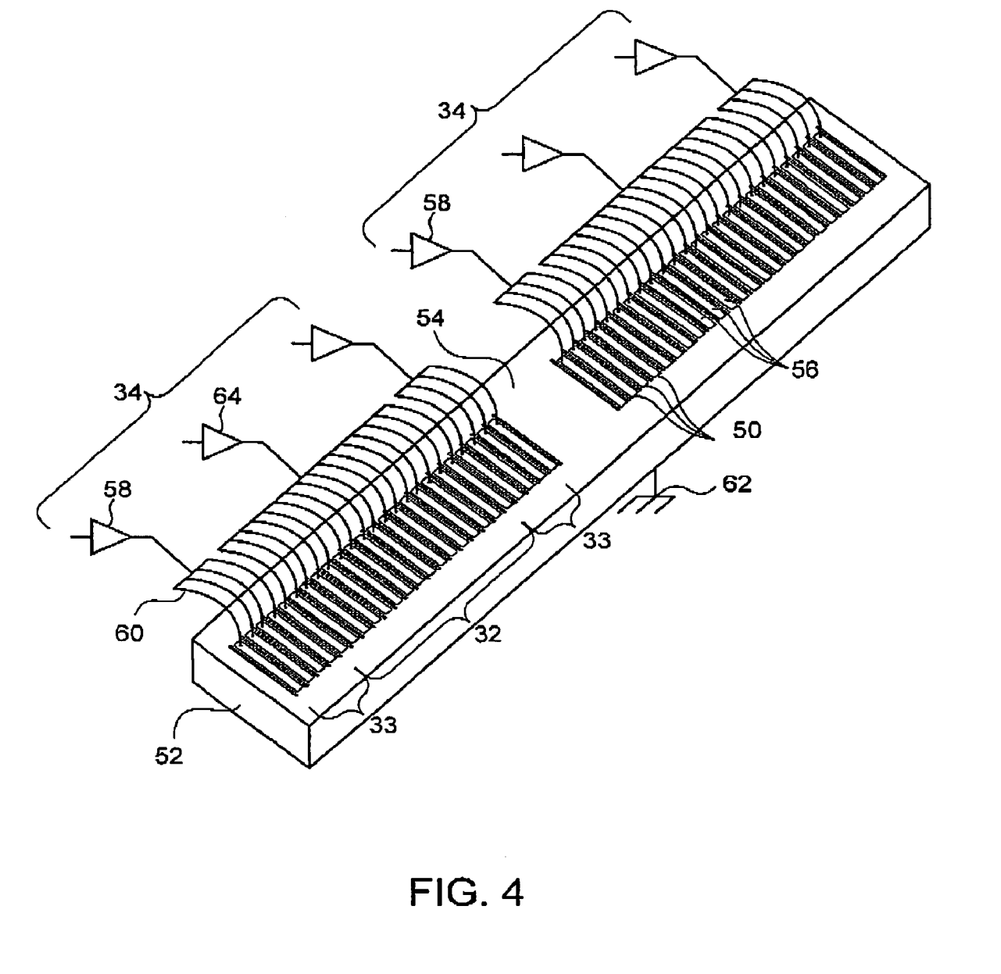
FIG. 4 is a perspective view of an embodiment of a light valve according to the present invention.

A specific embodiment of a light valve according to the present invention is shown in FIG. 4. The light valve comprises a plurality of silicon nitride ribbon elements 50 formed on a silicon substrate 52. A plurality of slots are etched into the upper surface 54 of substrate 52. The substrate material is also etched away under the ribbon elements 50 leaving each ribbon element suspended freely across surface 54. Each ribbon element 50 has a metallic electrode 56 formed on its upper surface that also serves as a reflective layer. Electrodes 56 are connected to a driver 58 via wire-bonded connections 60. Substrate 52 has a common electrode formed on its underside that is connected to a system ground shown at 62. When a voltage is applied to an electrode 56 by driver 58, an electrostatic force causes the associated ribbon element to deform downwardly towards the base of substrate 52, essentially forming a curved mirror.

The light valve operates in the same manner as described in relation to FIG. 1 and further detailed in U.S. Pat. No. 6,147,789. On application of a voltage by driver 58 to a high resolution area 33 comprising a group of elements 50, the connected elements all deform towards the substrate. A light beam incident on the high resolution area 33 is reflected through the aperture thus generating a spatially modulated beam. High resolution area 33, in this embodiment, comprises four individual ribbon elements 50. Alternatively, the high resolution area may be made up using any number of individual elements or even a single element.

Similarly a larger number of elements 50 are grouped to form low resolution area 32, driven by a driver 64. In contrast, prior art light valves have regular uniformly sized channels. Advantageously, groups of channels 34 may also be spaced apart on substrate 52, further corresponding to the pattern being imaged. Such non-uniformity is contrary to convention, which to date has concentrated on producing more and more channels of a regular size and spacing.

The present invention, in recognizing the regularity of features in certain imaging patterns, improves the imaging system performance for a given number of channels and drivers. By identifying the presence of regularly spaced low resolution features in the pattern, a specialized light valve may be fabricated with corresponding low resolution channels flanked by high resolution channels. As can be seen in FIG. 4, the total number of drivers required for such a light valve is significantly reduced. For the simple light valve shown, instead of the 12 drivers that would have been required to drive the channels only 6 drivers are required. In this example 3 drivers are saved for each of the low resolution channels by driving a large number of elements with a single driver. The invention enables a significant reduction in driver real estate, heat generation and connection difficulty.

While the present invention has been described in relation to a specific light valve, it is equally applicable to many other embodiments of multi-channel light valves known in the art. In fabricating the light valve of the present invention, the light valve may be fabricated with elements corresponding in number and location to the pattern. Alternatively, the light valve may be fabricated with a plurality of uniformly spaced elements that are then grouped and connected according to the required pattern. In practice many light valves are initially fabricated without connections, the connection being made in a separate wire-bonding step. The light valve of the present invention may thus be fabricated using a common substrate with fully formed elements. This is followed by a configuration step wherein the elements are connected according to a pattern, or range of similar patterns to be imaged.

While the present invention has been described in relation to display and electronic device fabrication the methods described herein are directly applicable to the imaging of any regular pattern including those used in biomedical imaging for Lab-on-a-chip fabrication.

As will be apparent to those skilled in the art in light of the foregoing disclosure, many alterations and modifications are possible in the practice of this invention without departing from the spirit or scope thereof.

What is claimed is:

1. A light valve for use in an imaging system, the light valve comprising a plurality of channels, each channel driveable independently of each of the other channels in response to a single driver input signal to output a corresponding radiation beam from the light valve, the channels and their corresponding output radiation beams having non-uniform sizes.

2. The light valve of claim 1, wherein the light valve has at least one low resolution channel corresponding to a low resolution feature in a regular pattern to be imaged.

3. The light valve of claim 2, wherein the low resolution channel comprises a plurality of light valve elements connected to a driver.

4. The light valve of claim 1, used for imaging color filter elements on a color filter substrate.

5. The light valve of claim 1, wherein the light valve is one of:
   a PLZT light valve;
   a TIR light valve; or
   a grating light valve.

6. A light valve according to claim 1 wherein each channel comprises a different number of individual light valve elements.

7. A light valve according to claim 1 wherein the plurality of channels comprises: a plurality of low resolution channels corresponding to a plurality of features in a regular pattern to be imaged; and a plurality of high resolution channels located adjacent to each low resolution channel, the high resolution channels corresponding to edges of the features in the pattern to be imaged.

8. A light valve according to claim 7 wherein the low resolution channels are spaced apart so as to correspond with a plurality of spaced apart features in the pattern to be imaged.

9. A light valve according to claim 8 comprising at least one high resolution channel located on each side of each low resolution channel.

10. A light valve according to claim 1 comprising a plurality of uniformly spaced light valve elements, wherein groups of light valve elements are electrically coupled to one another to form at least one low resolution channel and at least one high resolution channel, wherein a number of light valve elements electrically coupled to form the at least one low resolution channel is greater than a number of light valve elements electrically coupled to form the at least one high resolution channel.

11. A light valve according to claim 1 wherein the light valve comprises at least one high resolution channel corresponding to an edge of a feature in a pattern to be imaged.

12. A light valve according to claim 1 wherein the plurality of channels comprises:
a low resolution channel comprising a low resolution number of individual light valve elements coupled to be driven by a low resolution driver; and
a high resolution channel comprising a high resolution number of individual light valve elements coupled to be driven by a high resolution driver, wherein the low resolution number is greater than the high resolution number.

13. A light valve according to claim 12 wherein the low resolution number and the high resolution number are selected to correspond with a pattern to be imaged.

14. A light valve according to claim 12 wherein the plurality of channels comprises a plurality of high resolution channels, each high resolution channel comprising a corresponding high resolution number of individual light valve elements coupled to be driven by a corresponding high resolution driver, the low resolution number greater than each of the corresponding high resolution numbers.

15. A light valve according to claim 14 wherein at least a first high resolution channel is located on a first side of the low resolution channel and at least a second high resolution channel is located on a second side of the low resolution channel.

16. A light valve for use in an imaging system, the light valve comprising a plurality of individually driven channels, the channels having non-uniform sizes in accordance with a pre-determined regular pattern to be imaged;
wherein the light valve has at least one low resolution channel corresponding to a low resolution feature in the regular pattern and wherein the light valve has at least one high resolution channel corresponding to an edge of the low resolution feature.

17. The light valve of claim 16, wherein the high resolution channel comprises at least one light valve element connected to a driver.

18. The light valve of claim 17, comprising at least one high resolution channel adjacent to each low resolution channel.

19. The light valve of claim 18, comprising at least one high resolution channel located on either side of each low resolution channel.

20. The light valve of claim 16, comprising a plurality of uniform regularly spaced light valve elements and wherein groups of elements are connected to form at least one low resolution channel and at least one high resolution channel.

21. The light valve of claim 20, wherein at least a portion of the plurality of light valve elements are not connected to either a low resolution channel or a high resolution channel.

22. A light valve for use in an imaging system, the light valve comprising a plurality of individually driven channels, the channels having non-uniform sizes in accordance with a predetermined regular pattern to be imaged;
wherein the light valve has at least one low resolution channel corresponding to a low resolution feature in the regular pattern and wherein the light valve comprises a plurality of low resolution channels spaced apart in accordance with a plurality of low resolution features in the regular pattern.

23. An imaging system for imaging features onto a substrate, the imaging system comprising:
a line illuminator;
a light valve having a plurality of channels, each channel driveable independently of each of the other channels in response to a single driver input signal to output a corresponding radiation beam from the light valve, the channels and their corresponding output radiation beams having non-uniform sizes; and
a lens for imaging the light valve onto the substrate.

24. An imaging system according to claim 23 wherein the plurality of channels comprises;
a low resolution channel comprising a low resolution number of individual light valve elements coupled to be driven by a low resolution driver; and
a high resolution channel comprising a high resolution number of individual light valve elements coupled to be driven by a high resolution driver,
wherein the low resolution number is greater than the high resolution number.

25. A method for imaging a regular pattern of features with a multi-channel imaging head, comprising:
analyzing the pattern to identify the features;
imaging a body portion of the a feature with a low resolution channel; and
imaging an edge of the feature with at least one high resolution channel.

26. The method of claim 25, wherein the pattern is a single color separation of a multi-color image.

27. The method of claim 25, wherein a plurality of features are imaged simultaneously.

28. The method of claim 25, further comprising:
providing a substrate for receiving the imaged features; and
placing a dye donor element over the substrate.

29. A method of fabricating a light valve for imaging a regular pattern of features with a multi-channel imaging system, comprising:
analyzing the pattern to identify the features;
fabricating a plurality of uniform regularly spaced light valve elements on a light valve substrate; and
connecting groups of elements to form low resolution channels and high resolution channels, the channels corresponding to the pattern.

30. A light valve for use in an imaging system, the light valve comprising:
a first group of light valve elements having a first number of individual light valve elements electrically coupled to one another so as to be actuatable by a single first driver; and a second group of light valve elements having a second number of individual light valve elements electrically coupled to one another so as to be actuatable by a single second driver, wherein the first number of light valve elements and the second number of light valve elements are different from one another and an output beam emitted from the light valve by the first group of light valve elements has a size different than an output beam emitted from the light valve by the second group of light valve elements.

31. A light valve for use in an imaging system, the light valve comprising:

a first driver input for selectively activating a first channel to emit a first output radiation beam from the light valve; and a second driver input for activating a second channel to emit a second output radiation beam from the light valve;

wherein a size of the first channel is different from a size of the second channel and a size of the first output beam is different than a size of the second output beam.

* * * * *